United States Patent [19]

Osga

[11] Patent Number: 5,757,358
[45] Date of Patent: May 26, 1998

[54] METHOD AND APPARATUS FOR ENHANCING COMPUTER-USER SELECTION OF COMPUTER-DISPLAYED OBJECTS THROUGH DYNAMIC SELECTION AREA AND CONSTANT VISUAL FEEDBACK

[75] Inventor: Glenn A. Osga, San Diego, Calif.

[73] Assignee: The United States of America as represented by the Secretary of the Navy, Washington, D.C.

[21] Appl. No.: 464,163

[22] Filed: Jun. 5, 1995

Related U.S. Application Data

[63] Continuation of Ser. No. 988,605, Mar. 31, 1992, abandoned.

[51] Int. Cl.[6] .................................................. G09G 5/08
[52] U.S. Cl. .................................... 345/146; 345/157
[58] Field of Search ..................................... 345/145, 156, 345/157, 146, 163, 167

[56] References Cited

U.S. PATENT DOCUMENTS

| | | |
|---|---|---|
| 3,906,197 | 9/1975 | Grover . |
| 4,245,244 | 1/1981 | Lijewski et al. . |
| 4,698,625 | 10/1987 | McCaskill et al. ............... 345/145 |
| 4,725,829 | 2/1988 | Murphy ............................ 345/145 |
| 4,734,689 | 3/1988 | Kurakake . |
| 4,812,829 | 3/1989 | Ebina et al. ..................... 345/145 |
| 4,814,755 | 3/1989 | Johnson et al. . |
| 4,847,605 | 7/1989 | Callahan et al. . |
| 4,896,291 | 1/1990 | Gest et al. . |
| 4,987,527 | 1/1991 | Hamada et al. . |
| 5,315,313 | 5/1994 | Shinagawa ...................... 345/157 |

OTHER PUBLICATIONS

Osga, Glenn A., "Improved Target Selection on Displays", Aug. 22, 1990 Department of Defense Human Factors Engineering Technical Group.

Osga, Glenn A., "Cursor Pointing Aid: Using Enlarged Target Area and Constant Visual Feedback to Aid Cursor Pointing", 2–6 Sep. 1991, Human Factors Society 35th Annual Meeting.

Osga, Glenn A., "Using Enlarged Target Area and Constant Visual Feedback to Aid Cursor Pointing Tasks", 2–6 Sep. 1991, Human Factors Society 35th Annual Meeting.

Potter, Richard L. et al., "Improving the Accuracy of Touch Screens: An Experimental Evaluation of Three Strategies", 1988, pp. 27–32, Assoc. for Computing Machinery.

*Primary Examiner*—Regina Liang
*Attorney, Agent, or Firm*—Harvey Fendelman; Michael A. Kagan; Peter A. Lipovsky

[57] ABSTRACT

A method and apparatus for enhancing computer-user selection of computer-displayed objects reduces required cursor travel distance to an object by increasing the effective object selection area without enlarging the displayed size of either the object symbology or cursor. This is done through the constant computation of a "selectable" cursor target, which is the object closest to the current cursor position on a computer-display. The distance to all display symbols is computed in real-time as a cursor is moved. The system identifies the "selectable" object by providing a visual indication to the computer-user of the closest object to the cursor before a computer-user selection action is made. A computer-user selection confirmation action, such as the depressing of a mouse switch, erases the "selectable" object identifier and displays a visual indication that the object is a "selected" object. Object selection speed and accuracy is improved by the application of the invention.

52 Claims, 4 Drawing Sheets

METHOD AND APPARATUS FOR ENHANCING COMPUTER-USER SELECTION OF COMPUTER-DISPLAYED OBJECTS THROUGH DYNAMIC SELECTION AREA AND CONSTANT VISUAL FEEDBACK

CROSS REFERENCE TO RELATED APPLICATION

This is a continuation of Ser. No. 07/988,605, filed 31 Mar. 1992 now abandoned.

STATEMENT OF GOVERNMENT INTEREST

The invention described herein may be manufactured and used by or for the Government of the United States of America for governmental purposes without the payment of any royalties thereon or therefor.

DOCUMENTS INCORPORATED BY REFERENCE

Fitts, P. M. 1954. "The Information Capacity of the Human Motor System in Controlling Amplitude of Movement," Journal of Experimental Psychology, vol. 47, pp. 381–391.

Greenstein, J. S. and L. Y. Arnaut. 1988. "Input Devices," Handbook of Human Computer Interaction. M. Helander, ed. New York: Elsevier.

Welford, A. T. 1968. Fundamentals of Skill. London: Methuen.

BACKGROUND OF THE INVENTION

1. Field of the Invention

This invention relates to computers having a visual display and a user input pointing device such as a mouse, trackball, touchscreen, joy stick, etc. More specifically, the invention pertains to a method and apparatus for enhancing a computer-user's selection of objects displayed on his computer-screen.

2. Description of the Related Art

Current user-interface designs typically require a computer-user to place a cursor directly upon an object to be selected. Once the user locates the object he desires to select, the user must move his cursor the entire length from its instant location to the object to be selected. Once the cursor and object overlap, the operator provides an input, such as through a mouse, trackball, joy stick, etc., indicating that the overlapped object is to be selected. Visual feedback is presented only after the user performs an action to select the object. That is, it is only after the user tries to select an object does he know whether he has hit or missed the object he desires to select.

Thus, in a typical case, a user must move his cursor to an object to be selected, estimate that his cursor appropriately overlaps the limited area directly over an object to be selected, and then must make a selection action. Visual confirmation of the success of the selection action is received by the operator only after the selection action has taken place.

SUMMARY OF THE INVENTION

The United States Navy has been and is currently, investigating the use of nonconventional control-display configurations for use in future console designs. A primary user task at these consoles is the selection (called track "hooking") of displayed symbols/objects. The symbols represent real-world objects.

Other user tasks include the selection of various computer functions as well as making data entry into a computer. The Navy is also investigating the use of various computer input devices, and on-screen, direct manipulation methods, such as filling in pop-up menus to complete console tasks. These methods contrast with current use of programmable (variable label) function keys and cursor arrow keys.

The Navy envisions the need for a substantial increase in cursor placement tasks, especially in quick-response, weapon system control environments. User response speed and selection accuracy of symbol objects and other menu objects must be optimized in these environments.

In the past, researchers have studied cursor selection tasks for several input devices utilizing various control/display ratios, see Greenstein et al. referred to above. Yet design aspects related to visual feedback (object highlighting), as well as distance and size enhancements have not been well studied.

In general, symbol/object selection performance can be described by Welford's variation of Fitts's Law, see the Fitts and Welford references cited above.

Fitts's Law states that, within certain limits, distance moved to an object to be selected and object size affect selection performance time. It is known that cursor positioning time is affected by design factors such as control/display ratio, cursor velocity, and quality of visual feedback. One can imply from Fitts's Law that user-interface aids which decrease cursor travel and enhance the size of selected objects would improve object selection speed.

Yet for practical reasons, such as symbol clutter and overlap, computer-displayed objects must remain as small as possible, within limits prescribed by minimum visual requirements. For some displays, the distance between displayed objects will vary according to real-world perspective as well as user selection of display range-scale. Computer displayed objects may be tightly grouped and therefore be overlapping, or they may be spread about the entire computer display screen. The challenge proposed is to effectively decrease distance between objects and increase object size, without visually altering the size of the displayed objects (display symbology).

Object selection aids here disclosed were developed and applied to both symbol/object selection as well as pop-up menu object fill-in tasks. The selection aids of the invention reduce required cursor travel distance from the cursor to an object by increasing the effective selection area for an object. The object selection area is changed without altering the displayed size of either the symbology or cursor. Further, the selection areas surrounding objects may change dynamically with changes in the objects displayed. This permits selection optimization regardless of whether the arrangement of objects is pre-known.

The invention is accomplished through the constant computation of a "selectable" cursor target, defined as the object closest to the current cursor position on the computer-display. The invention identifies the "selectable" object by providing visual highlighting to the computer-user before a selection action is made.

A computer determination of which object lies closest to a computer-user controlled cursor is made for all displayed objects in real-time as a cursor is moved. If a cursor is equidistant from two or more objects, one of these objects is made "selectable" according to a decision making routine.

Contrary to prior art schemes, the "selection area" of an object is not limited to that directly over the object itself and is not limited to a predefined region. In the invention, the selection area for computer-displayed objects, such as symbols or pop-up menu items, is made as large as possible depending upon the arrangement of the objects on a screen. This selection area is computer determined and is defined as the area surrounding the object that is closest to that object as contrasted to being closest to another object. The selection area may dynamically change with changes in displayed object arrangements and does not depend upon any previous knowledge of object location.

Once an operator has placed his cursor in the area closest to an object he will at once be notified of this as the object will become visually identified as being "selectable." A selection confirmation action by the computer-user, such as the pressing of a mouse button, would select the "selectable" object. This action would be made known to the computer-user as the object will become visually identified as being "selected".

OBJECTS OF THE INVENTION

It is an object of the invention to enhance computer-user selection of computer-displayed objects.

Another object of the invention is to improve the speed and accuracy of computer-user selection of computer-displayed objects.

Another object of the invention is to effectively decrease the distance between computer-displayed objects without visually altering the displayed symbology of the objects.

A further object of the invention is to effectively increase computer-displayed object size and hence object selection area without visually altering the displayed symbology of the object.

Still a further object of the invention is to effectively increase computer-displayed object size and hence object selection area dynamically so that selection areas will change according to changes in the computer-displayed objects.

Yet another object of the invention is to improve visual feedback to a computer-user tasked with selecting computer-displayed objects.

Yet a further object of this invention is to indicate to a computer-user whether an object will be selected if he makes a selection decision.

Still another object of this invention is to indicate to a computer-user whether in fact a computer-displayed object has been selected.

Other objects, advantages and new features of this invention will become apparent from the following detailed description of the invention when considered in conjunction with the accompanied drawings.

BRIEF DESCRIPTION OF THE DRAWINGS

FIG. 1 also shows a "selectable" object visual indicator.

DESCRIPTION OF THE PREFERRED EMBODIMENT

As previously discussed, the selection aid of the invention reduces required cursor travel distance to a cursor target by increasing the effective cursor target selection area when possible. This is done without enlarging the displayed size of either the symbology or the cursor. The selection aid of the invention is accomplished through the constant computation of a "selectable" object, which is the computer-displayed object lying closest to the cursor position on a computer-display. The invention identifies t he "selectable" object by providing a visual indication to the user before a selection action is made. Determination of a "selectable" symbol or menu item will now be discussed.

Figure 1:
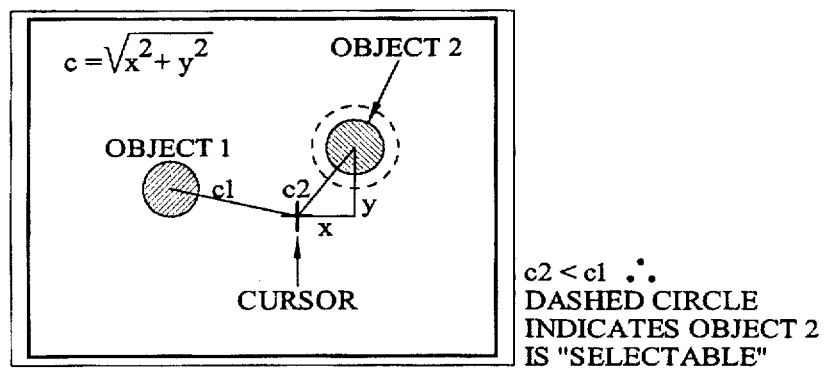
FIG. 1 illustrates an exemplary technique that may be used to calculate the distance between two objects from a cursor.

As shown i n FIG. 1, a computer is used to determine the x and y coordinates of objects with respect to cursor center location. These distances can be computed in conventional ways such as by the Pythagorean Theorem. Of course, for those objects that are horizontally or vertically aligned with the cursor, only the x or y coordinate, respectively, need be determined.

In the invention the distance to all displayed symbol-objects is computed in real-time as a cursor is moved. If the cursor is equidistant or overlapping two or more symbols, a decision making routine is used to highlight one of the objects. For example, the last closest symbol-object could be chosen for highlighting or whichever of the overlapping objects was displayed first could be chosen.

Referring once again to FIG. 1, it can be seen that the edge of object 2 is closer to the cursor. The dashed circle around this object indicates that it would be selected if a selection action is performed by a computer-user. This continuous visual feedback could be provided by a variety of means such as a color change, inverse video, border color change, etc.

Figure 2:
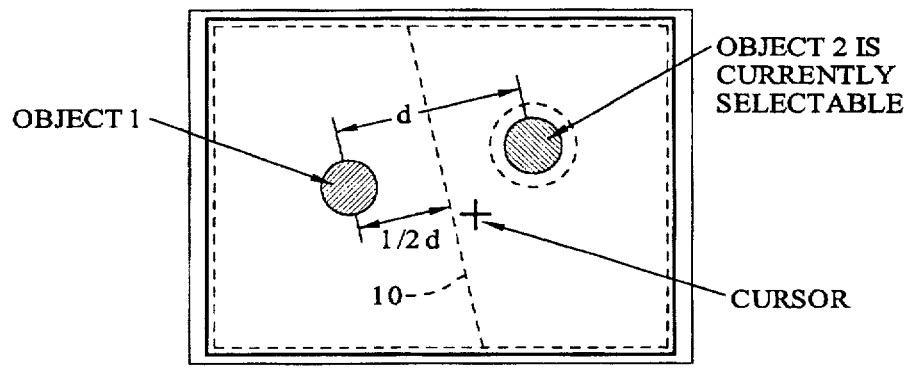
FIGS. 2 and 3 illustrate the enlarged selection area made possible through use of the invention.

In FIG. 2 objects 1 and 2 are shown with demarcation line 10 tracing a border equidistant between the objects.

Figure 3:
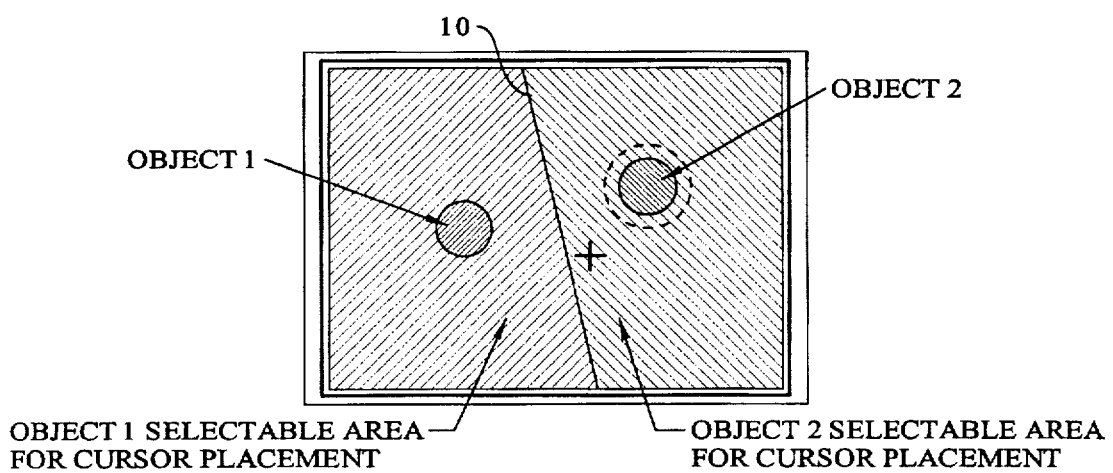

Referring now to FIG. 3, the selection areas closest to objects 1 and 2 are shown separated by border 10. Cursor placement anywhere within the region closest to these objects will permit the corresponding object to be selected. According to the invention, the computer-user will be informed which object is closest to his cursor by a visual indicator marking the closest object as being "selectable". It should be noted that the selection areas shown in FIG. 3 will constantly change whenever the objects displayed change. That is if objects are added, subtracted or moved, the selection areas will be recomputed in real-time accordingly to adjust to the change in object display. In this regard the selection areas can be considered "dynamic" and have no need to rely upon previous knowledge of object location.

Figure 4:
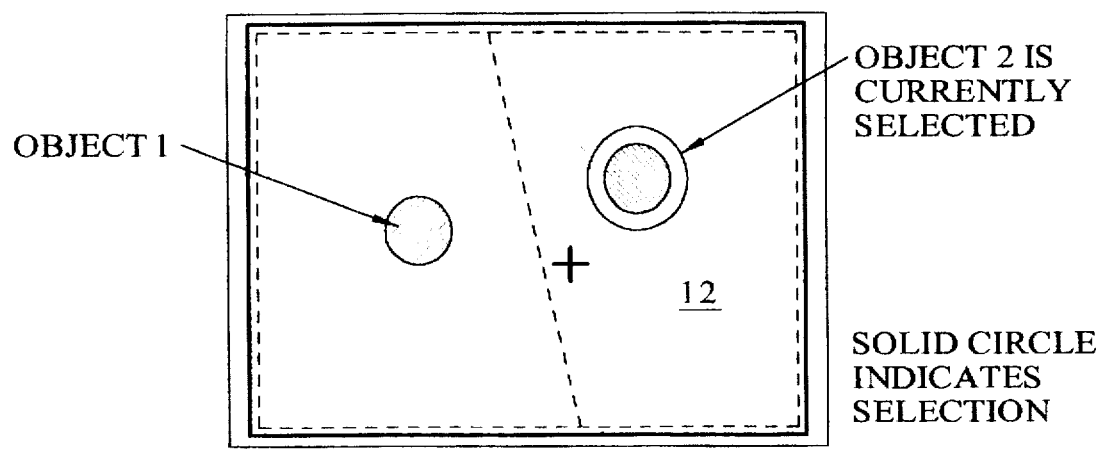
FIG. 4 illustrates a visual indicator that may be used to show a "selected" object.

Referring now to FIG. 4, once a computer-user finds an object he desires to select, he moves the cursor anywhere within the selectable area of that object, in this case area 12, and then makes a confirmation action indicating that the "selectable" object is desired to be selected. The invention will then inform the user that such a selection has taken place.

Such selection action will be indicated to the user by the "selectable" visual indicator being changed to a "selected" visual indicator. In FIG. 4 a solid circle indicates that object 2 is currently selected. Of course other visual indications such as a color change, inverse video, border color change, etc., may be used to indicate the "selected" status of object 2.

Figure 5:
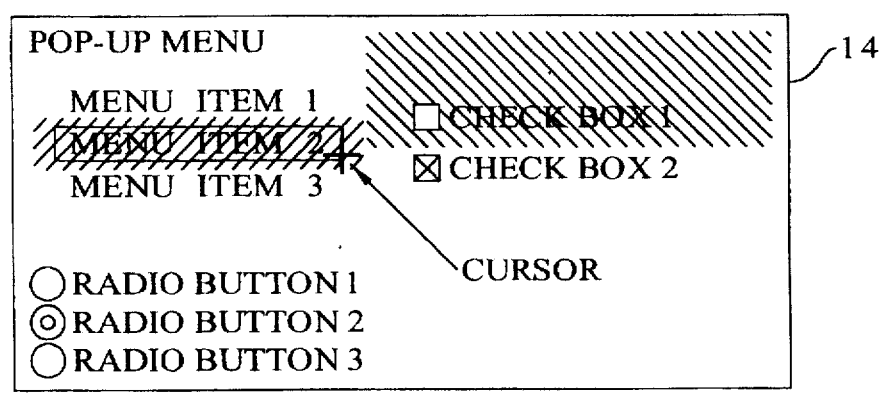
In FIG. 5 a representative pop-up menu is shown in which cross-hatching illustrates some of the enlarged object selection areas of this menu.

Referring now to FIG. 5, a representative pop-up menu 14 is illustrated. The selection areas for computer-displayed objects of pop-up menu 14, such as menu item 1, menu item 2, menu item 3, etc. will be made as large as possible depending upon the location of these selection "items" with respect to each other. As shown in FIG. 5, the selection areas for two objects will differ depending upon their locations in relation to other displayed objects.

"Check Box 1" has a large selection area because it is at the end (top) of a list, while "Menu Item 2" has a smaller selection area, being in the middle of an object group. Highlighting of the "selectable" menu object can be done by placing a green square around the object, which turns to inverse video if the object is selected. Of course other schemes may be used. In FIG. 5 a solid border is placed around "Menu Item 2" to indicate that this object has been selected.

Figure 6A:
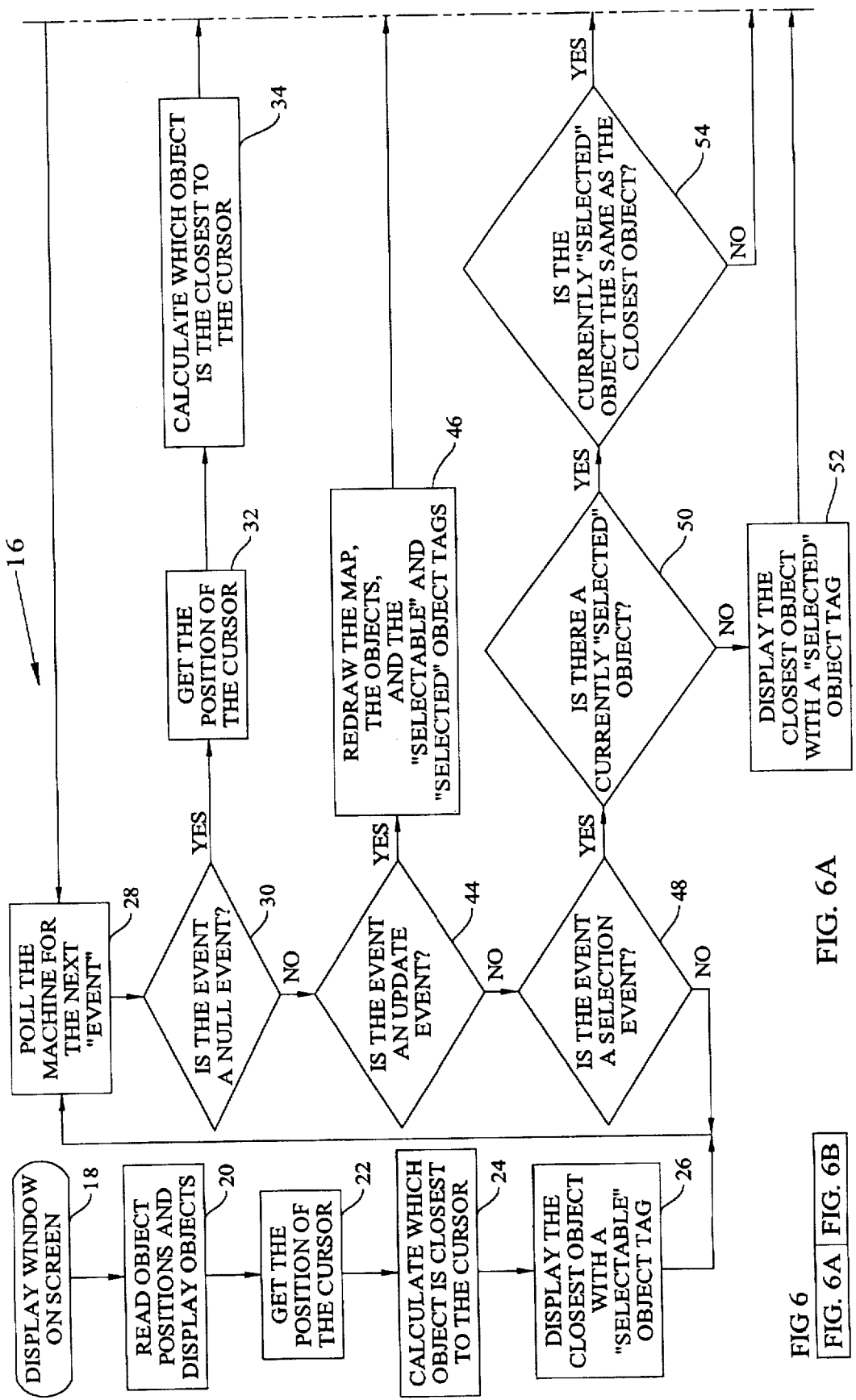
FIGS. 6A and 6B are a flow chart charting the operations of one implementation of the invention.
Figure 6B:
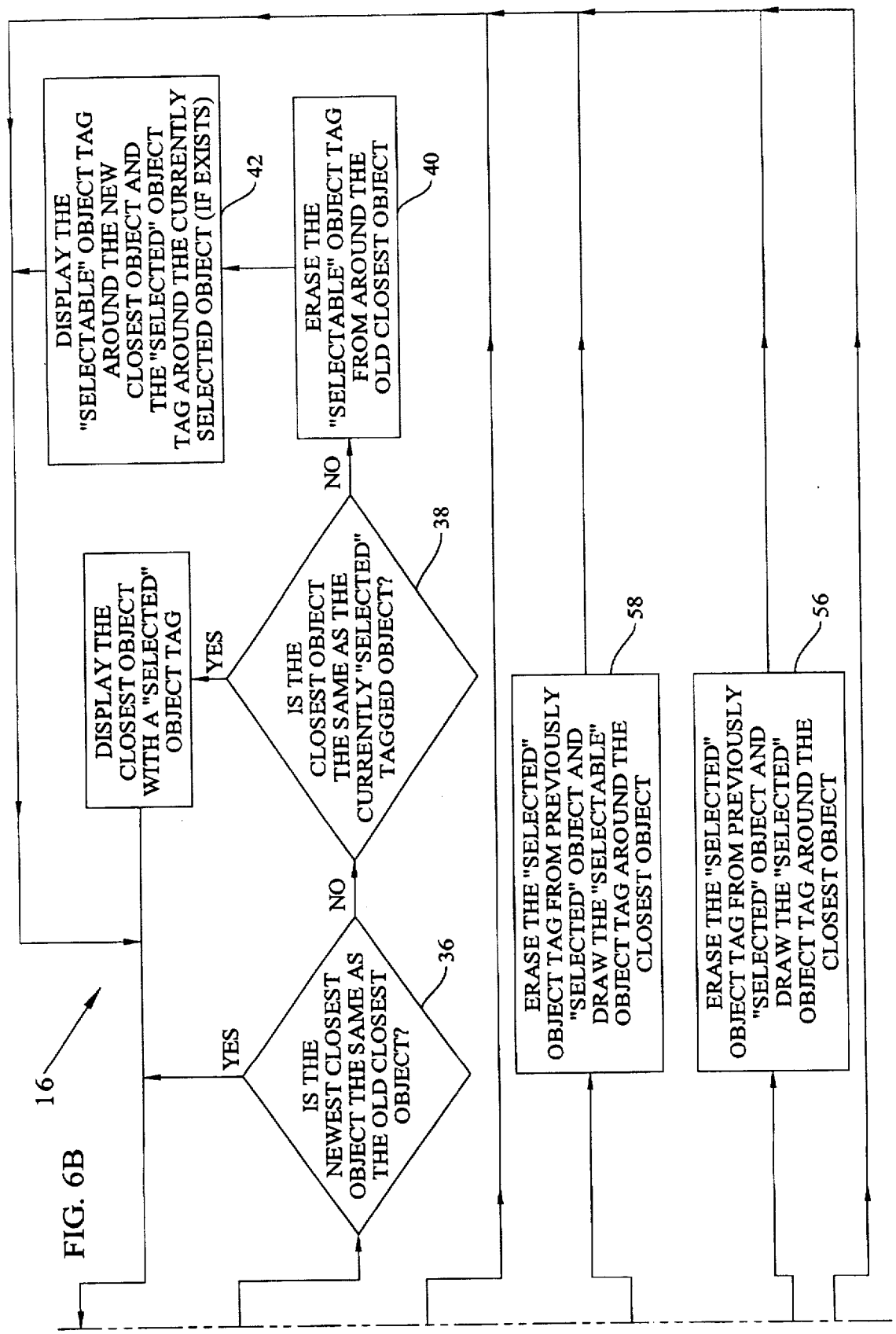

Referring now to the flow chart of FIGS. 6A and 6B, a representative decision-making scheme such as may be utilized in the invention is shown. Referring now to flow chart 16 of FIGS. 6A and 6B, an exemplary program begins by displaying a desired window area on a computer-screen (step 18). In step 20 objects are drawn on the computer-screen and the object positions are read. In step 22 the position of a user-controlled cursor is obtained. In step 24 the program computes the distance to all the displayed objects from the cursor. After calculating which object is closest to the cursor, a "selectable" object tag is placed around the closest object. This is shown as step 26.

The program now enters a loop that constantly monitors user inputs. The program then performs certain actions, depending upon what type of "event" is generated. In the enfolding description, event is meant to indicate a particular scenario that may take place.

The monitoring loop of the program is illustrated as step 28. In step 28, the machine (computer) is polled for the next occurring "event".

For the example program illustrated in FIGS. 6A and 6B, three different type events can take place.

A "null event" is an event generated when no other event has occurred. In step 30 a decision block is used to query whether this event has taken place. On this event, the computer reads the cursor position, step 32, and calculates which object is closest to the cursor, step 34. If the newest closest object is the same as the old closest object, step 36, the program goes back to the beginning of the event loop and asks for the next event, step 28. Otherwise, a query is made as to whether the closest object is the same as the currently "selected" tagged object, step 38. If the answer to this query is no, the "selectable" object tag is erased from around the old closest object, step 40, and in step 42 the "selectable" object tag is displayed around the new closest object and the "selected" object tag is displayed around the currently selected object if one exists. The program then goes back to the beginning of the event loop 28.

An "update event" is generated when something was previously obscuring the displayed window but has now moved, leaving a previously obscured portion of the window viewable. If the answer to this query, step 44, is positive, the computer simply redraws the area of the window that is now viewable including the objects, the "selectable" object tag and the "selected" object tag, shown as step 46.

A "selection event" is generated when the switch on an input device (mouse, trackball, touch panel, etc.) is actuated. This is shown as step 48. If there is such an event, the next query is whether there is a currently "selected" object, step 50. If there is not a currently "selected" object, the computer draws a "selected" object tag around the closest object. This is shown as step 52. The loop starting with step 28 begins once again. If there is a currently "selected" object, it must then be asked whether the currently selected object is the same as the closest object, step 54. If this is not the case, the program will erase the "selected" object tag from the previously "selected" object and draw the "selected" object tag around the closest object tag, this being shown as step 56. The program then enters the loop starting with step 28, in which the computer is polled for the next "event." If, in step 54, there is a currently "selected" object and the selected object is the same as the "selectable" (closest) object, the program will erase the "selected" object tag from the previously "selected" object and draw the "selectable" object tag around the closest object. The program will once again enter the loop starting with step 28.

Attached to this specification as an appendix is an object code listing of a computer program suitable for implementing the above described program functions. This "C" language program references commercially available software libraries known as "CChore" and "CCollaborator" copyrighted to the Symantec Corporation. It is to be understood, that this "C" language program is given by way of example and that one skilled in the art will realize that other programs may be utilized within the scope of the present invention to accomplish the tasks described herein.

Studies have been conducted to measure the effect of using the selection aid of the invention. These studies focused on the use of the invention with various computer-user input device configurations. Speed and accuracy of user performance for symbology selection and pop-up menu selection tasks were measured.

The mean selection times for input devices such as touchscreen, trademark "UNMOUSE", trackball and mouse, when used with the program of the invention, suggested high selection speed and low error rate. The use of the invention improved performance with all the input devices used. Pop-up menu selection accuracy was significantly increased for all input devices studied.

In the past symbol hooking on OJ-194 Navy trackball consoles resulted in relatively poor hooking performance. A personal computer trackball utilizing the invention demonstrated a substantial improvement in hooking speed without an increase in hooking errors. In addition to these benefits, the easier hooking implied that console users would not have to change their display range-scale as often to increase symbol spacing for hooking. The user would therefore not have to sacrifice seeing the "big picture", that is a view of a larger map range-scale, to select symbols which are closely positioned. Thus, existing Navy consoles can be significantly improved by incorporating the invention.

For all input devices tested, the invention improved speed of symbol selection for both relatively low and relatively high symbol densities and improved symbol selection accuracy under low-density symbol conditions. Low density in this case consisted of a test pattern of six 7-cm diameter symbols arranged in an elliptical pattern confined to a quarter of a 19-inch RADIUS color cathode ray tube. The high-density track pattern consisted of four separate approximately 25-cm symbol clusters containing two, three, and five adjacent symbols in close proximity.

A significant reduction of menu-item selection errors was also found to be shown with use of the invention. This is especially true with touchscreen and touchtablet technologies.

The increase in hooking performance speed and reduction (or no increase) in hooking errors using the method of the invention is considered to have important implications not only for Navy consoles, but for other cursor-pointing tasks.

Despite the continuous calculation of cursor to object distances, a particular implementation of the invention with an Apple Macintosh IIci exhibited no visible graphic updating delays, even when 200 tracks were placed on a screen during software debugging. For this implementation, the number of processor instructions per symbol was kept small (approximately 10.), and computer performance was not diminished even when performing calculations for many objects using a 25 MHz 68030 processor.

Other applications of the invention could include selection of "desktop" items such as folders and file icons, which can be placed at various display locations in many current interface styles. The program of the invention may also benefit selection of small objects such as window "close boxes" or small screen applications such as notebook computers. It is envisioned that handicap users with marginal pointing skills may also benefit from using the invention.

Considering the task hours which are spent pointing and clicking with current user-interface styles, the invention could produce substantial productivity benefits for a variety of users and applications.

Obviously, many modifications and variations of the invention are possible in light of the above teachings. It is therefore to be understood that within the scope of the appended claims, the invention may be practiced otherwise than as has been specifically described.

Navy Case No. 73,084

APPENDIX

Navy Case No. 73,0..

```
/*****************************************************************

CAHAChore.h

Interface for the AHA Chore Class

SUPERCLASS: CCursorChore

***()***()*******()***********()*()****************()***********/ class CAHAObject;

class CAHAChore : public CCursorChore {        / Class declaration. / public:

/ Instance Variables /

CAHAObject*  itsAHAObject;
        Point        itsMovement;

/ Methods / virtual void    IAHAChore    (   CAHAObject*    aAHAObject,
                                     Point          threshold    );
    virtual void    DoCursor     (   Point*         cursorLoc    );
    virtual void    CalcCursor   (   Point*         cursorLoc    );
};
```

A-1

Navy Case No. 73,084

```
/******************************************************************

CCursorChore.h

Interface for the Cursor Chore Class

SUPERCLASS: CChore - A chore is executed at a known interval.

( CChore © 1989 Symantec Corporation. All rights reserved. )

**()****()*******()************()*()*******************()*********/ pragma once include "CChore.h"

class CCursorChore : public CChore {          / Class declaration. / public:

/ Instance Variables /

Point      itsThreshold;      /* Movement threshold.          */
        Point      itsLastCursor;     /* Most recent cursor location. */
        Point      itsMovement;       /* Direction cursor is moving.  */

/ Methods / virtual void   ICursorChore    ( Point           threshold  );

virtual void   Perform         ( void    );
    virtual void   DoCursor        ( Point*          cursorLoc  );
    virtual void   CalcCursor      ( Point*          cursorLoc  );
};
```

A-2

Navy Case No. 73,08'

```
/*****************************************************************
CAHAObject.h Interface for the AHAObject Class.

SUPERCLASS: CCollaborator - A collaborator is a class with a list of
                objects called dependents. It has a method DependUpon which
                adds a pointer to itself to another collaborator's list of
                dependents.

( CCollaborator © 1989 Symantec Corporation. All rights reserved. )

*O***O*******O*********O*O***********************O**********/ pragma once include "CCollaborator.h"

class CStack;          /* Forward declaration - A simple stack.   */
class CAHAChore;

class CAHAObject : public CCollaborator {         /** Class declaration.  **/

/ Instance Variables of CAHAObject / public:
        CObject*      itsPreselectClient;  /* Preselected object.         */
        CObject*      itsSelectedClient;   /* Selected object             */
        CAHAChore*    itsChore;            /* Chore which tracks cursor.  */
        CStack*       itsCandidates;       /* Stack of nearest objects.   */

/ Methods of CHooker / virtual void     IAHAObject        ( Point        threshold );

virtual CObject* Scan              ( Point*       cursorLoc );

virtual void     Preselect         ( CObject*     client    );
        virtual void     Select            ( CObject*     client    );
        virtual void     SelectPreselected ( void  );

virtual void     DoCursor          ( Point*       cursorLoc );
        virtual void     CalcCursor        ( Point*       cursorLoc );

virtual CObject* Scan              ( Point*       cursorLoc );
        virtual long     ScanClient        ( Point*       cursorLoc,
                                             CObject*     client    );

virtual long     CalcDistance      ( Point*       position,
                                             Rect*        area      );
        virtual void     CalcClientRect    ( CObject*     client,
                                             Rect*        cRect     );
        virtual CObject* ChooseCandidate   ( void );

virtual CAHAChore* MakeAHAChore    ( Point*       threshold );
};
```

A-3

Navy Case No. 73,084

```
/*******************************************************************
CCursorChore.c
                      The Cursor Chore Class Code that executes when the cursor moves.

This class of object polls the cursor location and performs some action
    when the cursor position changes beyond a given threshold expressed in
    horizontal and vertical coordinates.

*()*************()*****************************************/ include "CCursorChore.h"

extern Point gLastCursor;    // A Point = ( h, v )

/*******************************************************************
ICursorChore Initialize cursor chore.

Input: The minimum distance the cursor must move, horizontally OR
           vertically before the DoCursor method is called.

*()*************()*****************************************/ void    CCursorChore::ICursorChore(
    Point                threshold    )
{
    itsThreshold = threshold;
}

/*******************************************************************
Perform

Perform cursor chore. gLastCursor is courtesy of event loop which
    updates the cursor every time it moves. It is given in global coordinates.
    Checks the last cursor loc against the current cursor loc and calls
    DoCursor if the difference exceeds the threshold parameter.

*()*************()*****************************************/ void    CCursorChore::Perform()
{
    Point                cursorLoc;

cursorLoc = gLastCursor;

CalcCursor( &cursorLoc );        /* Adjust the cursor given in screen    */
                                     /* coordinates to coordinates local to  */
                                     /* window, screen region, etc.          */

/* Check if movement beyond threshold. */ if( Abs( cursorLoc.h - itsLastCursor.h ) >= itsLastCursor.h ||
        Abs( cursorLoc.v - itsLastCursor.v ) >= itsLastCursor.v )
```

A-4

Navy Case No. 73,084

```
    {
        DoCursor( &cursorLoc );      /* Call action routine. */ itsLastCursor = cursorLoc;   /* Save last location of cursor.   */
    }
}
/************************************************************************
 DoCursor

!!! OVERRIDE THIS METHOD !!!

React to cursor movement. Default is to do nothing at all.
 *()*********()*************************************************/ void    CCursorChore::DoCursor(
    Point*              cursorLoc )
{
}

/************************************************************************
 CalcCursor Calculate the position of the cursor. The cursor loc is always received in
    screen coordinates. If this is acceptable, don't override this method.
    Otherwise, adjust the cursor in this method to correspond to the desired
    coordinate system.
 *()*********()*************************************************/ void    CCursorChore::CalcCursor(
    register Point*    cursorLoc   )
{
}
```

Navy Case No. 73,084

```
/*****************************************************************
CAHAChore.c The AHA Chore Class An cursor chore which notifies an AHA object when the cursor moves.
    This chore is called once every event loop. This object saves and
    calculates the direction of cursor movement to be used to optimize
    the search for the nearest object.

SUPERCLASS = CCursorChore

*O***********O*******************************************/ include "CAHAChore.h"
include "CAHAObject.h"

/*****************************************************************
  IAHAChore

Initialize a AHA chore. The threshold parameter determines how far the
    cursor must move before the DoCursor method is called.

*O***********O*******************************************/ void CAHAChore::IAHAChore(
    CAHAObject*     aAHAObj,        /* Pointer to AHA object.    */
    Point           threshold )     /* How far must cursor move ? */
{
    CMouseChore::IMouseChore( threshold );

itsAHAObject = aAHAObj;         /* Save ref to AHA object.    */ itsMovement.h = 0;              /* Set movement of cursor to 0,0*/
    itsMovement.v = 0;
}

/*****************************************************************
  DoCursor { OVERRIDE }

Save the movement of the cursor and call the AHA object's DoCursor
    method.

*O***********O*******************************************/ void CAHAChore::DoCursor(
    register Point*    cursorLoc    )
{
    itsMovement.h = cursorLoc->h - itsLastCursor.h;
    itsMovement.v = cursorLoc->v - itsLastCursor.v;

if( itsAHAObject ){
        itsAHAObject ->DoCursor( cursorLoc );
    }
}

/*****************************************************************
  CalcCursor { OVERRIDE }
```

A-6

Navy Case No. 73,084

```
    Calculate the position of the cursor. The cursor loc is always received in
    screen coordinates. This method calls the corresponding AHA method
    to allow the AHA object to make necessary coordinate adjustments. This way,
    the movement threshold still corresponds with the adjusted coordinate
    system and not the screen coordinate system.

*()*****************()********************************************/ void    CAHAChore::CalcCursor(
    register Point*    cursorLoc   )
{
    if( itsAHAObject ){
        itsAHAObject ->CalcCursor( cursorLoc );
    }
}
```

Navy Case No. 73,08

```
/***************************************************************
CAHAObject.c The AHA Object Class An abstract class which searches a list of dependent objects for
    the nearest object and either Pre-selects or Selects the nearest
    object. Objects become Selectable by becoming dependents of the
    AHA object via a call to DependUpon() method.

SUPERCLASS = CCollaborator

*()****************()**********************************/ include "CCollaborator.h"
include "CAHAChore.h"

/****************************************************************
IAHAObject

Initialize an AHA Object. The threshold parameter determines how far the
    cursor must move before the Scan method is called.

*()****************()**********************************/ void CAHAObject::IAHAObject(
    Point               threshold   )
{
    CCollaborator::ICollaborator();

itsPreselectClient = NULL;      /* No object pre-selected yet.  */
    itsSelectedClient  = NULL;      /* No object selected yet.      */ itsCandidates = new CStack;     /* Make stack to store possible */
    itsCandidates ->IStack();       /* nearest object.              */ itsChore = MakeAHAChore( threshold );  /* Make chore that feeds  */
                                           /* this object.           */
}

/****************************************************************
Preselect

Pre-select a client object.

*()****************()**********************************/ void CAHAObject::Select(
    register CObject*   client  )
{
    ChangeClientAppearance( itsPreselectClient,  /* Change appearance of the */
                            kNotPreselected );   /* Preselected client to be */
                                                 /* not pre-selected.        */
    itsPreselectClient = client;                 /* Save ref to new object.  */

ChangeClientAppearance( itsPreselectClient,  /* Change appearance of the */
                            kPreselected );      /* new Preselected client to*/
```

A-8

Navy Case No. 73,084

```
                                                    /* be pre-selected.           */
}
/***********************************************************************
Select Select a client.

*0*************0**********************************************/ void CAHAObject::Select(
    register CObject*    client  )
{
    ChangeClientAppearance( itsSelectedClient,  /* Change appearance of the */
                            kNotSelected );      /* Selected client to be    */
                                                 /* not Selected.            */
    itsSelectedClient = client;                  /* Save ref to new object.  */

ChangeClientAppearance( itsSelectedClient,  /* Change appearance of the */
                            kSelected );         /* new Selected client to   */
                                                 /* be Selected.             */
}

/***********************************************************************
SelectPreselected Select the pre-selected client. This method is called when an
    appropriate user action ( such as clicking a mouse button ) signals
    user's intention to select the pre-selected object.

*0*************0**********************************************/ void CAHAObject::SelectPreselected()
{
    if( itsSelectedClient != itsPreselectClient ){

Select( itsPreselectClient );
    }
}

/***********************************************************************
DoCursor Search for and Pre-select a new client.

*0*************0**********************************************/ void CAHAObject::DoCursor(
    register Point*     cursorLoc   )
{
    register CObject*   target;

target = Scan( cursorLoc );         /* Scan for a new preselected client.*/ if( target != itsPreselectClient ){ /* Is it already preselected ???   */

Preselect( target );            /* Preselect it.                   */
    }
}
```

A-9

Navy Case No. 73,084

```
/******************************************************************
CalcCursor Calculate the position of the cursor. ( Adjust coord system ).
    This method is called by the Object's cursor chore. It takes a cursor
    location in screen coordinates and adjusts it.
    Use this method if the coordinate system of interest is not based on
    screen coordinates.

*()**********()******************************************/ void    CAHAObject::CalcCursor(
    register Point*    cursorLoc  )
{
}

/******************************************************************
Scan

Scan for nearest object. The scan takes place in three parts. First, the
    clients are sorted according to position on the screen and the direction
    and position of the cursor. Objects which are in the wake of the cursor's
    movement and which are outside the screen region the cursor is in are
    excluded from the search. Obviously, any object in the cursor's wake,
    with the exception of the previously closest object, cannot possibly be
    closer to the cusor if the cursor is moving away from it. ( The previously
    nearest object is included in the sorted list. )

***()**************()********************************************/

/**
        This is a structure which is passed to the procedure below. */ typedef struct {
        CAHAObject*     aha;           /* The AHA object.              */
        CStack*         candidates;    /* Candidate nearest objects.   */
        Point*          cursorLoc;     /* Location of cursor.          */
        long            distance;      /* Minimum distance to object.  */
    } tScanRec;

/**
        This is a procedure which is called for each member of the sorted
        list of client objects. It calculates the distance from the
        cursor to the client object and adds the client to the list
        of possible nearest objects if the distance from the cursor to it
        is less than for any previously checked object or is zero. If the
        distance is less then previous, the previously nearest object is
        popped off the list. Objects with zero distances are not popped off
        the list since each one is eligible to be considered nearest object.
    **/ static void Client_Scan(
        register CObject    client,
        register tScanRec*  info )
    {
        register long   distance;

distance = info->aha->ScanClient( info->cursorLoc, client );
```

Navy Case No. 73,(

```
        if( distance == 0 && info->distance == 0 ){ info->candidates->Push(client);
        } else if( distance < info->distance ){  /* Could be zero first iteration. */ info->distance = distance;
            info->candidates->Pop();
            info->candidates->Push(client);
        }
    }

CObject*    CViewHooker::Scan(
    register Point*    cursorLoc    )
{
    tScanRec        info;
    CObject*        minClient = NULL;

if( itsDependents )                    /* Are there any clients ??? */
    {
        SortClientList( cursorLoc );       /* Routine to sort client list. */ info.aha = this;
        info.candidates = itsCandidates;
        info.cursorLoc = cursorLoc;
        info.distance = MAXLONG;           /* Scan All objects.         */ itsDependents->DoForEach1( Client_Scan, &info );

minClient = ChooseCandidate();     /* Resolve conflicts.        */
    }
    return minClient;                      /* Nearest client view ???  */
}

/****************************************************************************
ScanClient Scan a client. Calculate its distance from a given cursor location.

****************************************************************************/ long    CViewHooker::ScanClient(
    register Point*     cursorLoc,
    register CObject*   theClient    )
{
    register long       theDistance;        /* Distance to view.       */
    Rect                clientRect;         /* Rect of client view.    */

CalcClientRect( theClient, &clientRect );  /* Clients bounds.      */

/* Calculate distance from cursor loc to client edge.  */ theDistance = CalcDistance( cursorLoc, &clientRect );

return theDistance;                     /* Nearest client view ??? */
```

A-11

Navy Case No. 73,084

```
)
/************************************************************
 CalcDistance Calculate the distance from a point to edge of a rect/area.

*0**************0***********************************/ long    CViewHooker::CalcDistance(
    register Point*    cursorLoc,
    register Rect*     area    )
{
    register long      distance;        /* Distance to object.       */
    register long      nearness;        /* Distance as Point offset. */
    register short     dh, dv;          /* Horz; Vert offset.        */

/***********************************************************
        Nearness is measured as a point stored in a long. The LoWord is
        the horiz coord on the nearest edge of the object from the
        given cursorLoc. The HiWord is the vert coord on the nearest edge.
    ***********************************************************/ nearness = PinRect( area, *cursorLoc );

/***********************************************************
        Calculate the distance to nearest edge. If either dh or dv is
        zero (0), use the remaining delta. If both dh and dv are non-zero,
        use the Pathagorean theorem. This will save computing time for most
        situations since it is faster to do a comparison than a square root.
    ***********************************************************/ dh = Abs(LoShort( nearness ) - cursorLoc->h);
    dv = Abs(HiShort( nearness ) - cursorLoc->v);

if( !( dh&&dv ) )
        distance = dh > 0 ? dh: dv;
    else
        distance = sqrt( (double)dh*dh + (double)dv*dv );  /* Pathagorean. */ return distance;
}
/************************************************************
 CalcClientRect Calculate the rect of a client.

*0**************0***********************************/ void    CViewHooker::CalcClientRect(
    register CObject*  client,
    register Rect*     cRect           )
{
    /** Varies depending on object type. */
}

/************************************************************
 ChooseCandidate
```

A-12

Navy Case No. 73,(

```
    Choose the object in a list of candidates that is nearest to a point based
    on some criteria other than distance. ( eg Drawing order )

***()*************************()*************************************************/

CObject*    CViewHooker::ChooseCandidate()
{
    /** Varies depending on object type. */
}

/*********************************************************************************
 MakeAHAChore Make the Chore which drives this object from the main program loop. When
    the cursor moves, the chore will get a DoCursor message and call this
    object's DoCursor method.

***()*************************()*************************************************/

CAHAChore*  CAHAObject::MakeAHAChore(
    Point               threshold   )
{
    CAHAChore*          theChore;

theChore = new CAHAChore;
    theChore -> IAHAChore( this, threshold );

return theChore;
}
```

A-13

What is claimed is:

1. A method comprising the steps of:
   determining which of a plurality of computer-displayed objects is closest to a computer user controlled cursor; and
   enabling said closest computer-displayed object to be selected by said computer user without regard to whether said cursor is within a predetermined distance of said closest computer displayed object.

2. A method according to claim 1 further comprising the step of visually distinguishing said closest computer-displayed object from other computer-displayed objects of said plurality of computer-displayed objects.

3. A method according to claim 2 wherein said step of visually distinguishing said closest computer-displayed object includes highlighting said closest computer-displayed object.

4. A method according to claim 2, wherein said step of visually distinguishing includes changing a color of said closest computer-displayed object.

5. A method according to claim 2, wherein said step of visually distinguishing includes displaying said closest computer-displayed object in inverse video.

6. A method according to claim 2, wherein said step of visually distinguishing includes changing a border color of said closest computer-displayed object.

7. A method according to claim 2, wherein said step of visually distinguishing includes changing a border of said closest computer-displayed object.

8. A method according to claim 2, wherein said step of visually distinguishing includes changing a background appearance of said closest computer-displayed object.

9. A method according to claim 2, wherein said step of visually distinguishing includes changing a dimension of said closest computer-displayed object.

10. A method according to claim 1 in which the arrangement of said plurality of computer-displayed objects is not predefined.

11. A method according to claim 1, wherein said step of determining which of said plurality of computer-displayed objects is closest to said computer user controlled cursor includes:
    applying the Pythagorean Theorem to determine the distance from said computer user controlled cursor to each computer-displayed object of said plurality of computer-displayed objects; and
    identifying said closest computer-displayed object as that computer-displayed object that is at the smallest distance found by said step of applying the Pythagorean Theorem.

12. A method according to claim 1, wherein said step of determining which of said plurality of computer-displayed objects is closest to said computer user controlled cursor includes:
    applying the Pythagorean Theorem to determine the distance from said computer user controlled cursor to at least one of said computer-displayed objects.

13. A method according to claim 1, wherein said step of determining which of said plurality of computer-displayed objects is closest to said computer user controlled cursor includes:
    using a trigonometric function to determine the distance from said computer user controlled cursor to at least one of said computer-displayed objects.

14. A method according to claim 13 in which said trigonometric function is the Law of Cosines.

15. A method according to claim 13 in which said trigonometric function is the Law of Sines.

16. An apparatus for categorizing computer-displayed objects comprising:
    means for determining which computer-displayed object is closest to a user-controlled displayed cursor; and
    means for enabling said closest computer-displayed object to be selected by said computer user without regard to whether said cursor is within a predetermined distance of said closest computer displayed object.

17. An apparatus according to claim 16 in which said closest computer-displayed object is visually distinguished from other computer-displayed objects of said plurality of computer-displayed objects.

18. A method according to claim 17 wherein said step of visually distinguishing said closest computer-displayed object includes highlighting said closest computer-displayed object.

19. An apparatus according to claim 16 in which the arrangement of said plurality of computer-displayed objects is not predefined.

20. A method for facilitating computer-user selection of one of a plurality of computer-displayed objects comprising the steps of:
    determining which of said plurality of computer-displayed objects is closest to a user-controlled cursor;
    marking said closest computer-displayed object to visually distinguish it from other computer-displayed objects; and
    enabling said closest computer-displayed object to be selected by said computer-user without regard to whether said cursor is within a predetermined distance from said closest computer-displayed object.

21. A method for facilitating computer-user selection of computer-displayed objects comprising the steps of:
    determining which computer-displayed object is closest to a user-controlled cursor;
    marking said closest computer-displayed object to visually signify that said closest computer-displayed object is selectable by said computer-user; and
    enabling said closest computer-displayed object to be selected by said computer-user without regard to whether said cursor is within a predetermined distance from said closest computer-displayed object through the action of switching a selection switch.

22. A method according to claim 21 in which said closest computer-displayed object is selected by said computer-user, said method further including the step of:
    marking said selected closest computer-displayed object to visually signify that said closest computer-displayed object has been selected.

23. A method according to claim 21 in which said closest computer-displayed object is selected by said computer-user, said method further including the step of:
    visually changing said selected closest computer-displayed object to signify that said closest computer-displayed object has been selected.

24. An apparatus for easing computer-user selection of computer-displayed objects comprising:
    means for determining which computer-displayed object is closest to a user-controlled displayed cursor;
    means for visually distinguishing the closest computer-displayed object from other computer-displayed objects; and
    means for making said closest computer-displayed object eligible for selection by said computer-user without regard to whether said cursor is within a predetermined distance of said closest computer-displayed object.

25. An apparatus according to claim 24 further including:
means for marking said closest computer-displayed object when said closest computer-displayed object has been selected.

26. An apparatus according to claim 24 further including:
means for visually changing said closest computer-displayed object to signify that said closest computer-displayed object has been selected.

27. A method in which placement of a user-controlled cursor within an object selection area coupled with a selection action by said user will select a computer-displayed object within said object selection area, said method comprising the steps of:

determining which of a plurality of computer-displayed objects is closest to said computer user controlled cursor; and defining said object selection area based upon the distance of said closest computer-displayed object with respect to other computer-displayed objects of said plurality of computer-displayed objects.

28. A method according to claim 27 further including the step of:

marking said closest computer-displayed object to visually distinguish it from said other computer-displayed objects.

29. A method according to claim 28 in which said closest computer-displayed object is marked to visually indicate that it is selectable.

30. A method according to claim 28 in which said closest computer-displayed object is selected by said selection action of said user and in which said closest computer-displayed object is marked to visually indicate that it has been selected.

31. A method according to claim 28 in which said closest computer-displayed object is selected by said selection action of said user and in which said closest computer-displayed object is visually changed to indicate that it has been selected.

32. An apparatus in which placement of a user-controlled cursor within an object selection area coupled with a selection action by said user will select a computer-displayed object within said object selection area, said apparatus comprising:

means for determining which of a plurality of computer-displayed objects is closest to said computer user controlled cursor; and means for defining said object selection area based upon the distance of said closest computer-displayed object with respect to other computer-displayed objects of said plurality of computer-displayed objects.

33. An apparatus according to claim 32 further including:
means for marking said closest computer-displayed object to visually distinguish it from said other computer-displayed object.

34. An apparatus according to claim 33 in which said closest computer-displayed object is marked to visually indicate that it is selectable.

35. An apparatus according to claim 34 in which said closest computer-displayed object is selected by said selection action of said user and in which said closest computer-displayed object is marked to visually indicate that it has been selected.

36. An apparatus according to claim 34 in which said closest computer-displayed object is selected by said selection action of said user and in which said closest computer-displayed object is visually changed to indicate that it has been selected.

37. A method comprising the steps of:
determining which object of a plurality of objects appearing on a computer display is closest to a computer cursor; and enabling said object to be selected without regard to whether said object is within a predetermined distance from said cursor.

38. A method according to claim 32 further comprising the step of visually distinguishing said object determined to have the least distance from said cursor from other objects of said plurality of objects appearing on said computer display.

39. A method according to claim 37 in which the arrangement of said plurality of computer objects is not predefined.

40. A method according to claim 38 in which said closest computer object is selected, said method further including the step of visually marking said selected closest computer object to signify that said closest computer object is selected.

41. An apparatus comprising:
means for determining which object of a plurality of objects appearing on a computer display is closest to a computer cursor; and means for enabling said object to be selected without regard to whether said object is within a predetermined distance from said cursor.

42. An apparatus according to claim 41 further comprising:

means for visually distinguishing said object determined to have the least distance from said cursor from other objects of said plurality of objects appearing on said computer display.

43. An apparatus according to claim 42 in which said closest computer object is selected, said apparatus further including:

means for visually marking said selected closest computer object to signify that said closest computer object is selected.

44. A method comprising the steps of:
determining the distance between graphic objects appearing on a display screen and a cursor appearing on said display screen without regard to whether said objects are within a predetermined distance from said cursor; and visually distinguishing a graphic object determined to have the least distance from said cursor.

45. A method according to claim 44 in which the arrangement of said graphic objects is not predefined.

46. A method according to claim 44, wherein said step of visually distinguishing includes changing a color of said graphic object determined to have the least distance from said cursor.

47. A method according to claim 44, wherein said step of visually distinguishing includes displaying said graphic object determined to have the least distance from said cursor in inverse video.

48. A method according to claim 44, wherein said step of visually distinguishing includes changing a border color of said graphic object determined to have the least distance from said cursor.

49. A method according to claim 44, wherein said step of visually distinguishing includes changing a border of said graphic object determined to have the least distance from said cursor.

50. A method according to claim 44, wherein said step of visually distinguishing includes changing a background appearance of said graphic object determined to have the least distance from said cursor.

51. A method according to claim 44, wherein said step of visually distinguishing includes changing a dimension of said graphic object determined to have the least distance from said cursor.

52. An apparatus comprising:

means for determining the distance between graphic objects appearing on a display screen and a cursor appearing on said display screen without regard to whether said objects are within a predetermined distance from said cursor; and means for visually distinguishing a graphic object determined to have the least distance from said cursor.

* * * * *